(12) United States Patent
Hudgens et al.

(10) Patent No.: US 7,592,911 B1
(45) Date of Patent: Sep. 22, 2009

(54) CONSTRUCTION HARD HAT HAVING ELECTRONIC CIRCUITRY

(75) Inventors: David W. Hudgens, Alexandria, VA (US); John McDermott, Alexandria, VA (US)

(73) Assignee: ACCU-Spatial LLC, Alexandria, VA (US)

( * ) Notice: Subject to any disclaimer, the term of this patent is extended or adjusted under 35 U.S.C. 154(b) by 336 days.

(21) Appl. No.: 11/609,707

(22) Filed: Dec. 12, 2006

(51) Int. Cl.
*G08B 1/08* (2006.01)
*G05B 23/02* (2006.01)
*H02H 11/00* (2006.01)

(52) U.S. Cl. .................... 340/539.13; 340/3.1; 307/326

(58) Field of Classification Search ... 340/568.1–572.9, 340/539.11–539.32, 3.1, 3.51, 3.52; 382/115; 307/326
See application file for complete search history.

(56) References Cited

U.S. PATENT DOCUMENTS

| | | | | |
|---|---|---|---|---|
| 3,947,832 | A * | 3/1976 | Rosgen et al. | 340/539.13 |
| 4,245,347 | A | 1/1981 | Hutton et al. | |
| 4,648,131 | A * | 3/1987 | Kawaguchi et al. | 398/127 |
| 4,709,330 | A | 11/1987 | Yokoi et al. | |
| 4,833,726 | A | 5/1989 | Shinoda et al. | |
| 5,164,707 | A * | 11/1992 | Rasmussen et al. | 340/551 |
| 5,404,577 | A | 4/1995 | Zuckerman et al. | |
| 5,678,205 | A | 10/1997 | Gray | |
| 5,793,882 | A * | 8/1998 | Piatek et al. | 382/115 |
| 5,796,341 | A * | 8/1998 | Stratiotis | 340/573.1 |
| 6,232,887 | B1 | 5/2001 | Carson | |
| 6,298,249 | B1 | 10/2001 | Locarno et al. | |
| 6,512,312 | B1 * | 1/2003 | Herkenrath et al. | 307/326 |
| 6,609,913 | B1 | 8/2003 | Batts | |
| 6,798,392 | B2 | 9/2004 | Hartwell et al. | |
| 6,917,300 | B2 * | 7/2005 | Allen | 340/686.6 |
| 6,963,278 | B2 * | 11/2005 | Frame | 340/539.22 |
| 7,327,252 | B2 * | 2/2008 | Goehler | 340/539.13 |
| 7,478,108 | B2 * | 1/2009 | Townsend et al. | 707/104.1 |
| 2004/0261158 | A1 | 12/2004 | Depew et al. | |

FOREIGN PATENT DOCUMENTS

| | | |
|---|---|---|
| WO | WO02/25319 | 3/2002 |
| WO | WO03/049062 | 6/2003 |

OTHER PUBLICATIONS

"Digital Hardhat System," Emerging Construction Technologies, http://www.new-technologies.org/ECT/Civil/digitalhardhat.htm.

* cited by examiner

*Primary Examiner*—Jennifer Mehmood
(74) *Attorney, Agent, or Firm*—Coats & Bennett, P.L.L.C.

(57) ABSTRACT

Personnel activity at a construction site is tracked using electronic circuitry included in hard hats worn by personnel at the site. According to one embodiment, activity at a construction site is monitored by processing personal information directly or indirectly received from electronic circuitry formed as part of one or more hard hats worn by personnel located at the construction site. The personal information is uniquely associated with individual ones of the personnel. One or more messages are generated based on the personal information received from the electronic circuitry and personnel location. For example, the messages may warn particular personnel that they have entered an unauthorized area at the construction site. Optionally, personnel activity may be periodically monitored and reported.

31 Claims, 8 Drawing Sheets

CONSTRUCTION HARD HAT HAVING ELECTRONIC CIRCUITRY

BACKGROUND OF THE INVENTION

The present invention relates to a hard hat for use by personnel on a construction site where the hard hat includes electronic circuitry configured to directly or indirectly indicate location of personnel wearing the hard hats on the construction site, and store personal information uniquely associated with the personnel wearing the hard hats.

Maintaining workplace safety at construction sites is an arduous task. Construction sites pose unique and complicated challenges which make monitoring personnel safety difficult. For example, various people access a construction site throughout the life of a project, each person being responsible for a particular task or tasks. Some personnel may require access to certain areas of a construction site while others may not. For example, drivers require access to material loading and loading areas at a construction site while other workers require access to material processing areas for assembling delivered materials into useable construction material, e.g., a cement mixing zone for combining sand, water, etc. Still other personnel such as steel workers, plumbers, electricians, etc. require access to buildings being constructed at the site. Supervisors often have access to the entire site while other personnel such as inspectors may require limited access to particular areas during certain phases of a project. Authorization levels may change as a project advances, further complicating matters.

Various considerations such as safety requirements, training, certification, trade, skill level, experience, etc. may dictate which personnel have authorization to enter a particular area and which ones do not. In some situations, failure to satisfy required safety standards such as those mandated by the Occupational Safety & Health Administration (OSHA) in the United States can be costly and ultimately lead to shutdown of a construction site. For example, some areas of a construction site may contain hazardous materials. Personnel lacking sufficient safety equipment and training are prohibited from entering these areas. Unauthorized access or lack of supervision may result in fines or other sanctions.

As a result, tracking personnel activity and location at a construction site is a difficult task. Conventionally, some form of manual supervision is used. For example, personnel activity is conventionally monitored at a construction site by one or more supervisors who are physically present at the site or by personnel who remotely monitor cameras positioned throughout the construction site. Regardless, manual tracking of personnel activity at a construction site is expensive and unreliable at times, especially given the complex and dynamic nature of construction sites.

SUMMARY OF THE INVENTION

The methods, apparatus and computer program products taught herein provide a monitoring process for tracking personnel activity at a construction site. Personnel entering a construction site are issued construction hard hats, each hard hat having electronic circuitry. The electronic circuitry directly or indirectly indicates hard hat location and stores information pertaining to the person issued the hard hat. Sensors such as Radio Frequency (RF) sensors placed throughout the construction site detect the hard hat electronic circuitry as the circuitry moves within range of the sensors. When a sensor detects an in-range hard hat, the location of the hard hat is determined and personal information stored in its electronic circuitry is transferred to the sensor. The location and personal information is reported to a monitoring system. The monitoring system uses this information to track personnel movement, detect unauthorized activity, and generate reports.

According to one embodiment, activity at a construction site is monitored by processing personal information directly or indirectly received from electronic circuitry formed as part of one or more hard hats worn by personnel located at the construction site. The personal information is uniquely associated with individual ones of the personnel. One or more messages are generated based on the personal information received from the electronic circuitry and personnel location. In one embodiment, the messages warn those personnel who have entered an unauthorized area at the construction site, e.g., by causing a hard hat alarm to activate.

According to another embodiment, a construction hard hat comprises electronic circuitry. The electronic circuitry is configured to directly or indirectly indicate location of the hard hat, store personal information uniquely associated with a person, e.g., a person wearing the hard hat or a person issued the hard hat. The electronic circuitry is also configured to wirelessly transmit the personal information, e.g., to one or more RF sensors deployed at a construction site. As such, the hard hat transmits information uniquely associated with the person wearing it when the person moves within range of one or more of the sensors. This information, in conjunction with the hard hat's location, may be used to determine whether the person has entered an unauthorized area.

Of course, the present invention is not limited to the above features and advantages. Those skilled in the art will recognize additional features and advantages upon reading the following detailed description, and upon viewing the accompanying drawings.

DETAILED DESCRIPTION OF THE INVENTION

Figure 1:
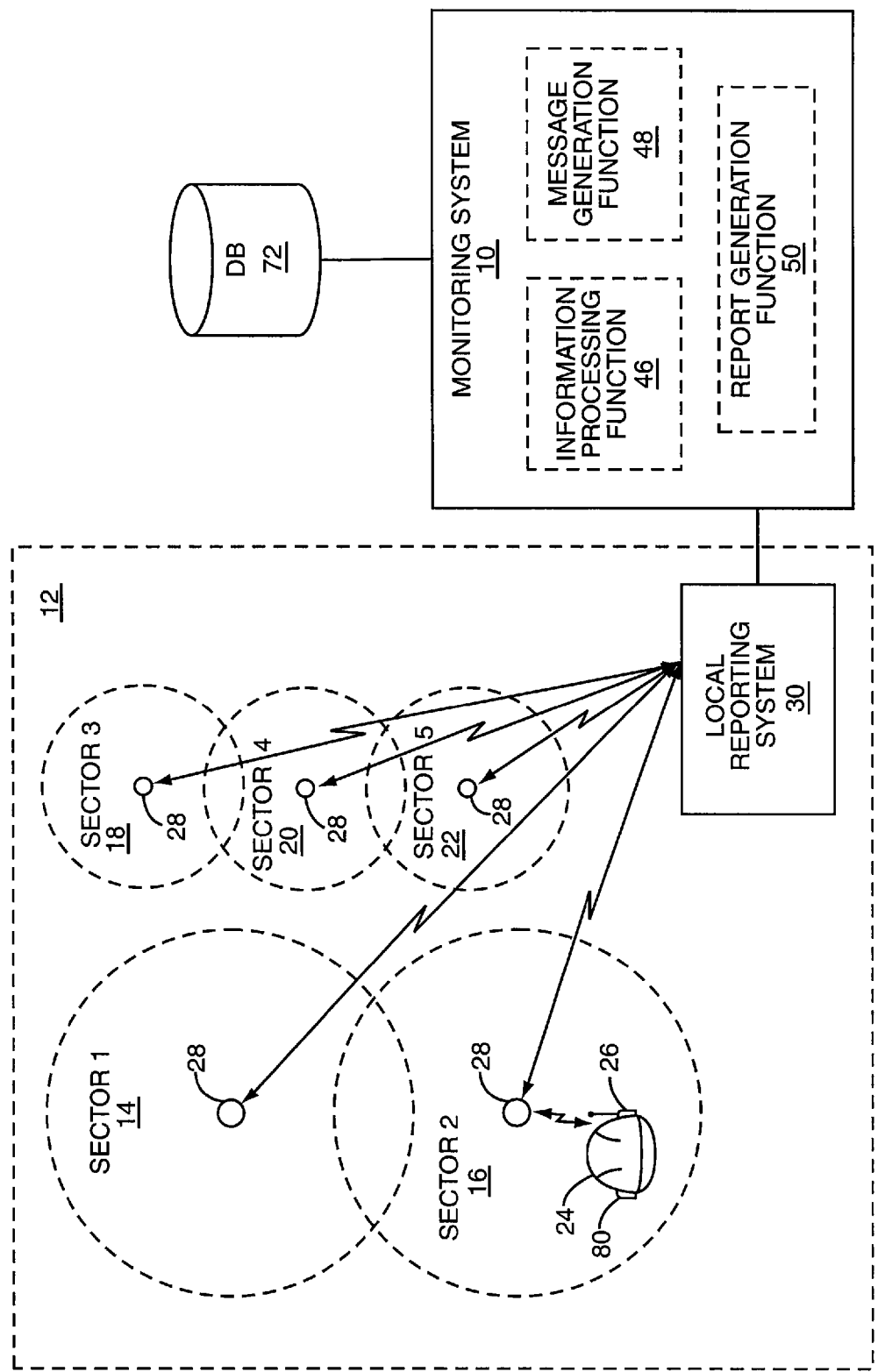
FIG. 1 is a block diagram of one embodiment of a monitoring system that tracks personnel activity at a construction site.

FIG. 1 illustrates an embodiment of a system 10 that automatically monitors personnel activity at a construction site 12. The construction site 12 has a plurality of sectors 14-22, the sectors 14-22 representing different areas within the construction site 12. Personnel entering the construction site 12 are issued a construction hard hat 24. The term "construction hard hat" or "hard hat" means a safety helmet worn on a construction site and does not include other safety helmets such as sports helmets, bicycle helmets, motorcycle helmets, race car helmets, or military helmets. Each hard hat 24 has electronic circuitry 26 formed as a part of thereof, e.g., by being embedded therein or affixed thereto. The electronic circuitry 26 directly or indirectly indicates hard hat 24 location and stores information pertaining to the person issued the hard hat 24. As such, location information and personal information may be periodically reported to the monitoring system 10 for processing. Monitoring system 10 uses the location information to track personnel movement about the site 12. The monitoring system 10 uses the personal information to determine whether individuals present at the site 12 are authorized to be in the sectors 14-22 indicated by their location information. Monitoring system 10 also generates messages warning personnel to leave unauthorized areas. As such, personnel activity throughout the construction site 12 may be automatically monitored and personnel automatically notified when they enter restricted areas.

In more detail, one or more sensors 28 such as Radio Frequency (RF) sensors are located in each sector 14-22 of the construction site 12. For example, as shown in FIG. 1, five sensors 28 are located throughout the construction site 12, each sensor 28 being located in one of the sectors 14-22. The sensors 28 may have different signal detection ranges, and thus, are capable of covering areas of varying size. For example, the third through fifth sectors 18-22 in FIG. 1 represent smaller areas at the construction site 12 as compared to the first and second sectors 14 and 16. As such, the sensors 28 located in the third through fifth sectors 18-22 cover smaller signal areas while the sensors 28 located in the first and second sectors 14 and 16 cover wider signal areas. Optionally, the sensors 28 may be directional, and thus detect signals propagating in some directions, but not others.

Regardless, the sensors 28 provide a communication bridge between the hard hat electronic circuitry 26 and the monitoring system 10, thus facilitating the delivery of location and personal information to the monitoring system 10 for processing. To that end, the sensors 28 detect the presence of hard hat electronic circuitry 26 when the circuitry 26 comes within signal range of one or more of the sensors 28. Location information associated with detected electronic circuitry 26 is provided to the monitoring system 10 along with personal information provided by the detected electronic circuitry 26. As such, personnel wearing hard hats 24 at the construction site 12 may be monitored when they enter one of the sectors 14-22 covered by one or more sensors 28.

In one embodiment, a wireless communication link is established between one or more sensors 28 and in-range hard hat electronic circuitry 26. To facilitate wireless communication, the hard hat electronic circuitry 26 and the sensors 28 have complimentary transmit and receive circuitry (not shown) for establishing wireless links such as Bluetooth links, WiFi links, WiMAX links, RFID links, ZigBee links, etc. Regardless as to the particular wireless communication protocol, the sensors 28 report the detection of in-range hard hat electronic circuitry 26 to the monitoring system 10, e.g., via a local reporting system 30. The local reporting system 30, e.g., a computer located at the construction site 12 periodically sends reported information to the monitoring system 10 for processing when the monitoring system 10 is located remotely off-site. Alternatively, the monitoring system 10 may be located at the construction site 12, thus obviating the local reporting system 30.

The sensors 28 may be connected to the local reporting system 30 or directly to the monitoring system 10 (if located on-site) via wireless links such as the kind previously described (Bluetooth, WiFi, etc.). Alternatively, the connection may be hard-wired, e.g., via an Ethernet link, phone line or other land line connection. Either way, the sensors 28 establish wireless communicative contact with the hard hat electronic circuitry 26 when personnel wearing the hard hats 24 come within range of the sensors 28. For example, as shown in FIG. 1, the sensor 28 covering the second sector 16 detects the electronic circuitry 26 included in the hard hat 24 worn by the person who has entered the second sector 16. This occurrence is reported for processing by the monitoring system 10.

When a wireless communication link is established between electronic circuitry 26 included in a particular hard hat 24 and one of the sensors 28, an indication of the circuitry's position is reported along with personal information stored by the circuitry 26. The reported location and personal information is used to determine whether the person wearing the hard hat 24 is permitted in the sector 14-22 covered by the reporting sensor 28, as described in greater detail later. In one embodiment, the electronic circuitry 26 directly determines its position, e.g., via the Global Positioning System (GPS) or via equivalent cellular location determining techniques such as Enhanced Observed Time Difference (E-OTD), cell of origin (COO), cell ID, angle of arrival, time of arrival, or radio frequency (RF) mapping techniques. The hard hat electronic circuitry 26 provides its location coordinates to one of the sensors 28 via a wireless communication link. The sensor 28 then reports the location coordinates to the monitoring system 10 for processing.

In another embodiment, the electronic circuitry 26 indirectly indicates its position by establishing a wireless communication link with one of the sensors 28. According to this embodiment, when one of the sensors 28 detects the presence of hard hat electronic circuitry 26, a wireless communication link is established and the sensor 28 reports detection of the electronic circuitry 26. Since the position of the reporting sensor 28 is known to the monitoring system 10, the in-range hard hat electronic circuitry 26 is known to be located somewhere within the coverage area of the reporting sensor 28, e.g., somewhere within the sector 14-22 or a portion of the sector 14-22 covered by the sensor 28. As such, the hard hat's position is indirectly determined when its electronic circuitry 26 establishes communicative contact with one or more of the sensors 28.

Figure 2:
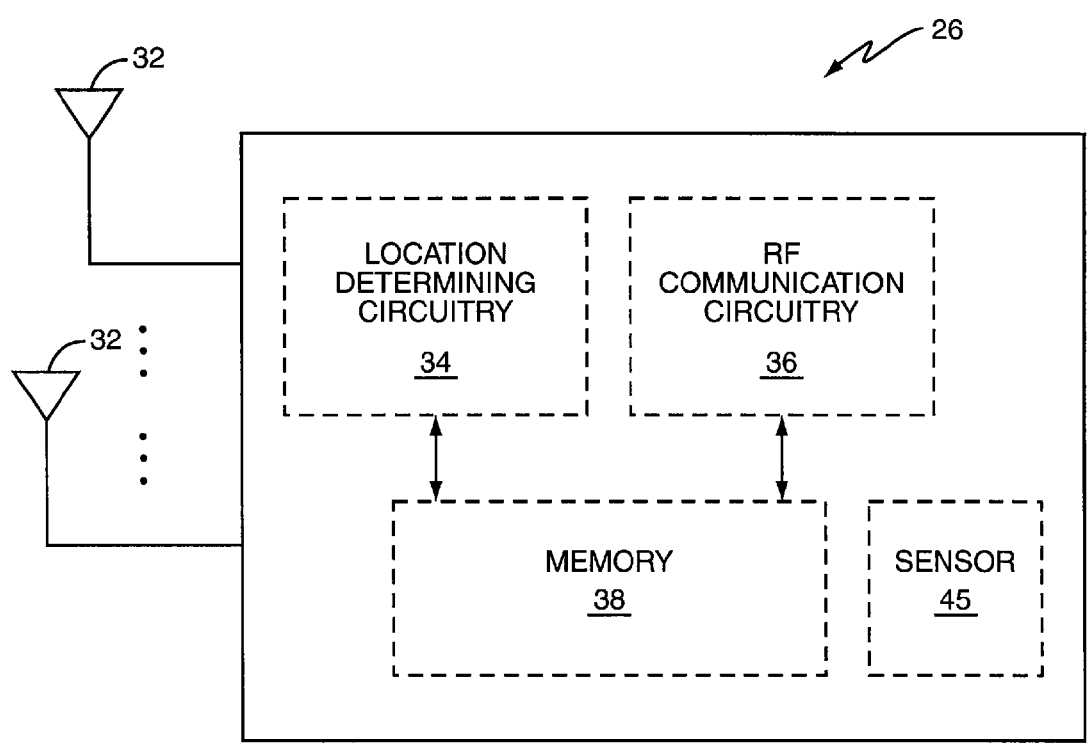
FIG. 2 is a block diagram of one embodiment of electronic circuitry included in a construction hard hat.

Turning now to the details of the construction hard hat 24, FIG. 2 illustrates one embodiment of the electronic circuitry 26 embedded therein, affixed thereto or otherwise associated therewith. According to this embodiment, the electronic circuitry 26 has one or more antennas 32 for facilitating receipt and transmission of wireless signals. Electronic circuitry 26 also has circuitry 34 for directly determining location and circuitry 36 for establishing a wireless communication link with one or more of the sensors 28. The location determining circuitry 34 comprises a GPS receiver or a cellular-based equivalent for directly determining location coordinates such as latitude, longitude and altitude. The location coordinates are stored in memory 38 included in or associated with the electronic circuitry 26.

In addition, personal information associated with the person issued the hard hat 24 is also stored in the memory 38. For example, personal information such as a personal identifier (e.g., employee serial number, social security number, etc.), medical history, medical conditions, trade, qualifications, certifications, proficiencies, training, education, prior safety violations, etc. may be stored in the memory 38. Alternatively or in combination, the personal information may be uniquely associated with one or more groups of persons having a common attribute such as trade, qualification, experience or any other attribute as indicated by the personal information. Optionally, some personal information may be stored by the monitoring system 10. However, at least a person's identifier is stored in the memory 38 so that person may be uniquely identified by the monitoring system 10. As such, location coordinates and personal information are available for retrieval from the memory 38 and reporting via the RF communication circuitry 36.

The RF communication circuitry 36 enables the electronic circuitry 26 to communicate wirelessly with in-range sensors 28 located at the construction site 12. For example, RF communication circuitry 36 may comprise any suitable circuitry for establishing a wireless communication link such as a WiFi transceiver, WiMAX transceiver, Bluetooth transceiver, ZigBee transceiver, RFID transponder or the like. After a communication link is established, the RF communication circuitry 36 transmits information stored in the memory 38 such as location coordinates and personal information to the sensor 28 it is in contact with.

Figure 3:
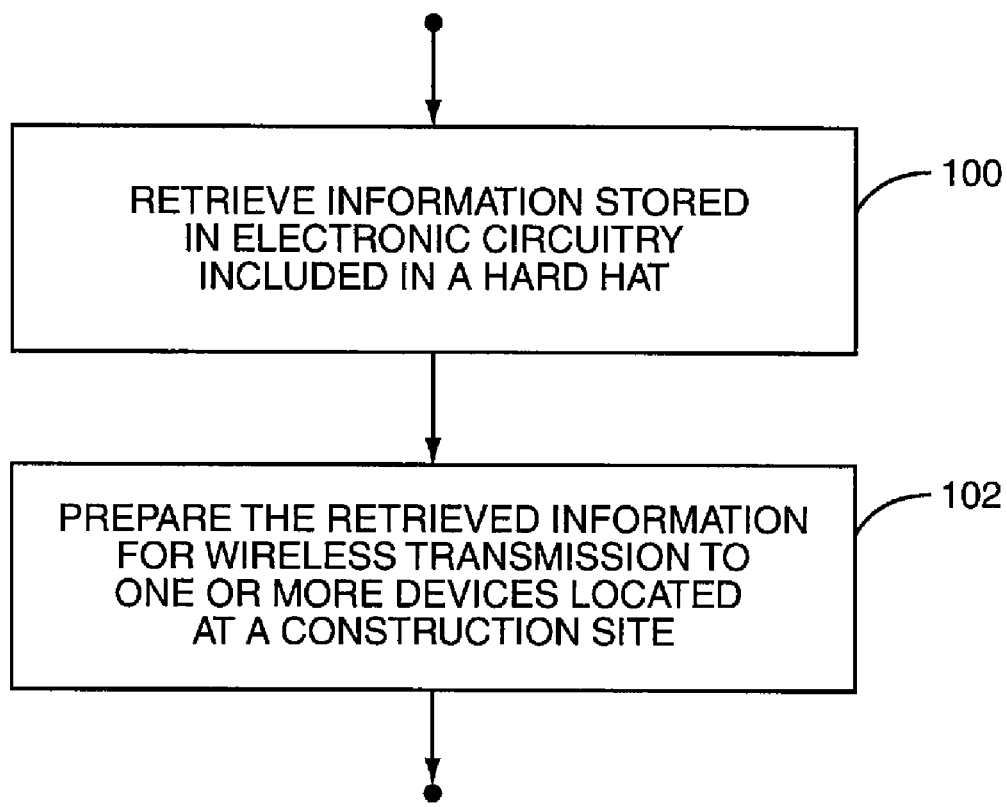
FIG. 3 illustrates one embodiment of processing logic for managing information stored in electronic circuitry included in a construction hard hat.

Using RFID as a purely illustrative example, the RF communication circuitry 36 comprises an RFID transponder. One of the antennas 32 (e.g., a coil) detects an RF activation signal emitted by one of the sensors 28. The RF activation signal emitted by the in-range sensor 28 enables communication with the RFID transponder and in the case of a passive RFID transponder, energizes the transponder. In response to detecting the RF activation signal, the RFID transponder accesses the memory 38 and transmits designated information to the activating sensor 28, e.g., personal information associated with the person wearing hard hat 24 and location information obtained by the location determining circuitry 34. To facilitate information transmission, the electronic circuitry 26 retrieves information such as personal information and/or location information from the memory 38, as illustrated by Step 100 of FIG. 3. The retrieved information is then prepared for transmission, as illustrated by Step 102 of FIG. 3. For example, the information retrieved from the memory 38 is encoded in compliance with the underlying wireless communication protocol used to establish a wireless communication link with one or more of the sensors 28.

In one embodiment, the memory 38 comprises a rewriteable memory device capable of overwriting previously stored information (e.g., old location coordinates) and a write-once memory device which stores personal information that cannot be updated. Alternatively, the personal information may be stored in the rewriteable memory device, thus allowing it to be revised. In yet another alternative, some personal information may be stored in the rewriteable memory device while other personal information is stored in the write-once memory device. Regardless, the memory 38 stores information designated for transmission to one or more of the sensors 28 and optionally stores information received from the sensors 28 or other devices (not shown) in communicative contact with the hard hat electronic circuitry 26. As such, personal information stored in the memory 38 may be updated over time. Those skilled in the art will readily recognize that information stored in the electronic circuitry 26 may be transmitted to and from one or more of the sensors 28 via other wireless protocols, and thus, are within the scope of the present invention.

Figure 4:
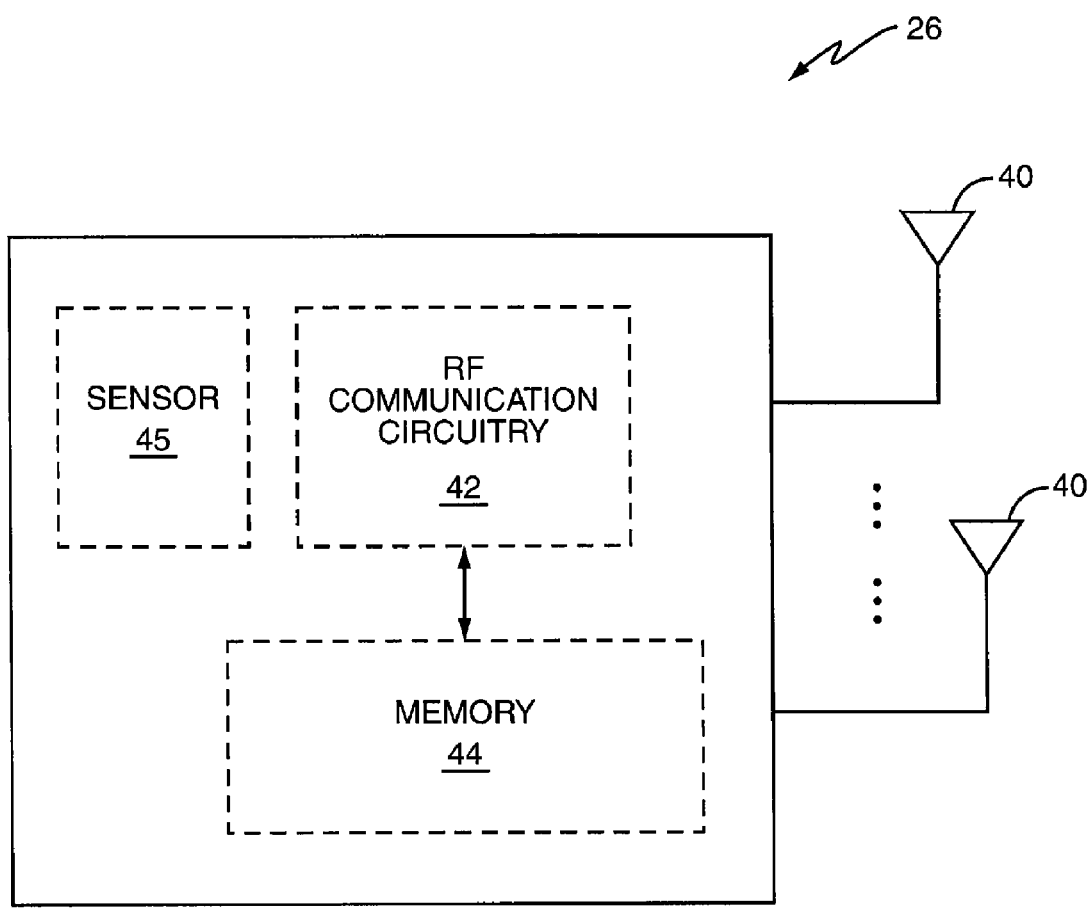
FIG. 4 is a block diagram of another embodiment of electronic circuitry included in a construction hard hat.

FIG. 4 illustrates another embodiment of the electronic circuitry 26 embedded in the construction hard hats 24, affixed thereto or otherwise associated therewith. According to this embodiment, the electronic circuitry 26 has one or more antennas 40 for facilitating receipt and transmission of wireless signals and circuitry 42 for establishing a wireless communication link with one or more of the sensors 28. However, the electronic circuitry 26 does not have circuitry for directly determining location. Instead, the electronic circuitry 26 indirectly indicates its location when it establishes a wireless communication link with one of the sensors 28. Since the position of the sensors 28 at the construction site 12 are known, the location of the electronic circuitry 26 can be approximated when it is detected by one of the sensors 28 as previously described.

The RF communication circuitry 42 enables the electronic circuitry 26 to communicate wirelessly with one or more of the sensors 28 as previously described. Memory 44 included in or associated with the electronic circuitry 26 stores personal information associated with the person issued the hard hat 24. The memory 44 may be write-once, rewriteable, or some combination of both whereby some information stored in the memory 44 may be updated while other information may not. Personal information stored in the memory 44 is retrieved, prepared for transmission, and sent to one of the sensors 28 via the RF communication circuitry 42, e.g., in accordance with the processing logic illustrated in FIG. 3.

Optionally, the RF communication circuitry 42 may receive new personal information from one of the sensors 28 or from another device (not shown) at the construction site 12 such as a portable computer. The new information replaces old information stored in the memory 44. For example, when a person receives new training or is permitted access to one or more of the sectors 14-22 once prohibited, this new information may be stored in the memory 44. As such, when the person enters a newly authorized sector 14-22, the newly stored information indicates the person now has the appropriate clearance. Conversely, revised personal information may indicate a person no longer has access to a particular one of the sectors 14-22. Whether a person's information is updated or not, the monitoring system 10 uses personal information retrieved from the hard hat electronic circuitry 26 to monitor and report personnel activity at the site 12.

In addition to the features described above, the system of the present invention has the ability to determine if a hard hat 24 is being worn by personnel on the construction site. One or more sensors 45 may be included in, associated with, or operatively connected to the electronic circuitry 26 shown in FIGS. 2 and 4. Hard hat compliance on construction sites is sometimes an issue. By providing each hard hat with a sensor 45 to determine if the hard hat is being worn, construction entities can immediately determine if all personnel on the construction site are wearing their assigned hard hats, and if not, the identity of those that are not wearing their assigned hats. Moreover, the usefulness and integrity of the entire system of the present invention depends on personnel wearing assigned hard hats 24. When personnel do not wear hard hats or wear a non-assigned hard hat, data processed by the monitoring system 10 is less reliable. The sensors 45 may comprise any device that detects whether a hard hat 24 is placed on a person's head, e.g., a body temperature sensor, pressure sensor, acoustic sensor, visual sensor, etc. Optionally, one or more of the sensors 45 may be capable of uniquely identifying the person wearing a hard hat 24.

According to one embodiment, one or more of the sensors 45 is a biometric sensor that uniquely identifies the person wearing a hard hat 24. In a purely illustrative example, a biometric sensor may uniquely identify a person based on his or her perspiration, odor, ear geometry, skin reflectivity (i.e., the skin's propensity to absorb/reflect light), etc. Biometric sensor and/or other sensor data may be stored in memory 38 or 44 and transmitted to monitoring system 10 via the wireless communication techniques previously described.

The function of sensor 45 is to determine if the associated hard hat has been worn by a person. In addition, as discussed above, the sensor may also determine if the hard hat is being worn by the person assigned the hard hat. Sensor 45 can be incorporated into the hardhat 24 in various ways. For example, the sensor 45 can be associated with an inner head band within the hard hat 24, attached or embedded in the hard hat, or incorporated into the electronic circuitry 26. As discussed herein, the system of the present invention has the ability to determine when a hard hat 24 has entered the construction site or any portion of the construction site. Thus, the monitoring of personnel for hard hat wearing compliance can be triggered by personnel entering the construction site or any portion thereof.

The monitoring system 10 processes received hard hat sensor data over time in addition to personnel location and personal information. As such, the monitoring system 10 is capable of not only tracking personnel activity throughout the construction site 12, it may also determine whether personnel are wearing a hard hat 24, and more particularly, the correct hard hat 24. In the event a person is not wearing a hard hat 24 or is wearing the wrong hard hat 24, the monitoring system 10 may issue a warning message, e.g., a message targeted to those hard hats 24 that report biometric data inconsistent with the personnel issued or otherwise assigned the hats.

Turning now to the details of the monitoring system 10, the system 10 implements several functions 46-50 (FIG. 1) for monitoring personnel activity at the construction site 12. The functions supported by the monitoring system 10 include information processing, message generation and information reporting. The monitoring system 10 comprises any suitable hardware and/or software such as one or more processors and corresponding software. The functions 46-50 may be implemented as physical circuits or sub-systems within the monitoring system 10, or may be implemented in whole or in part as functional "circuits" embodied in computer program instructions.

Figure 5:
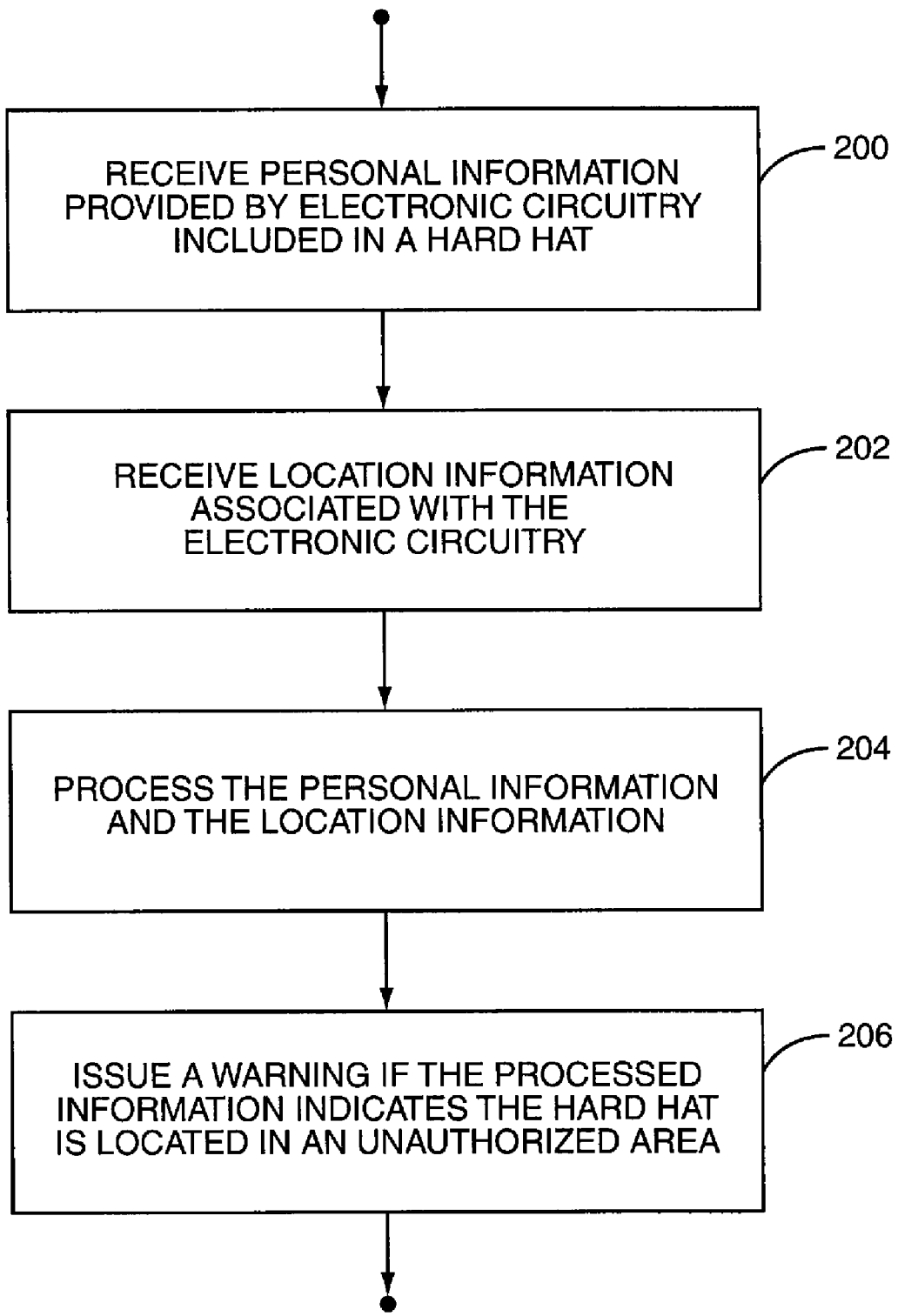
FIG. 5 illustrates one embodiment of processing logic for analyzing information provided by electronic circuitry included in a construction hard hat.

The information processing function 46 analyzes reported location and personal information, and optionally, hard hat sensor information reported by the hard hat electronic circuitry 26. To that end, the monitoring system 10 receives personal information provided by the hard hat electronic circuitry 26 directly from the sensors 28 in communicative contact with the circuitry 26 or from the local reporting system 30, as illustrated by Step 200 of FIG. 5. Likewise, the monitoring system 10 receives corresponding location information either directly or indirectly indicated by the electronic circuitry 26, as illustrated by Step 202 of FIG. 5. The information processing function 46 analyzes the location and personal information to determine whether personnel present at the construction site 12 are located in unauthorized areas, as illustrated by Step 204 of FIG. 5. In the event of an unauthorized access, a warning message such as a signal is directed to the person wearing the offending hard hat 24, as illustrated by Step 206 of FIG. 5.

Figure 6:
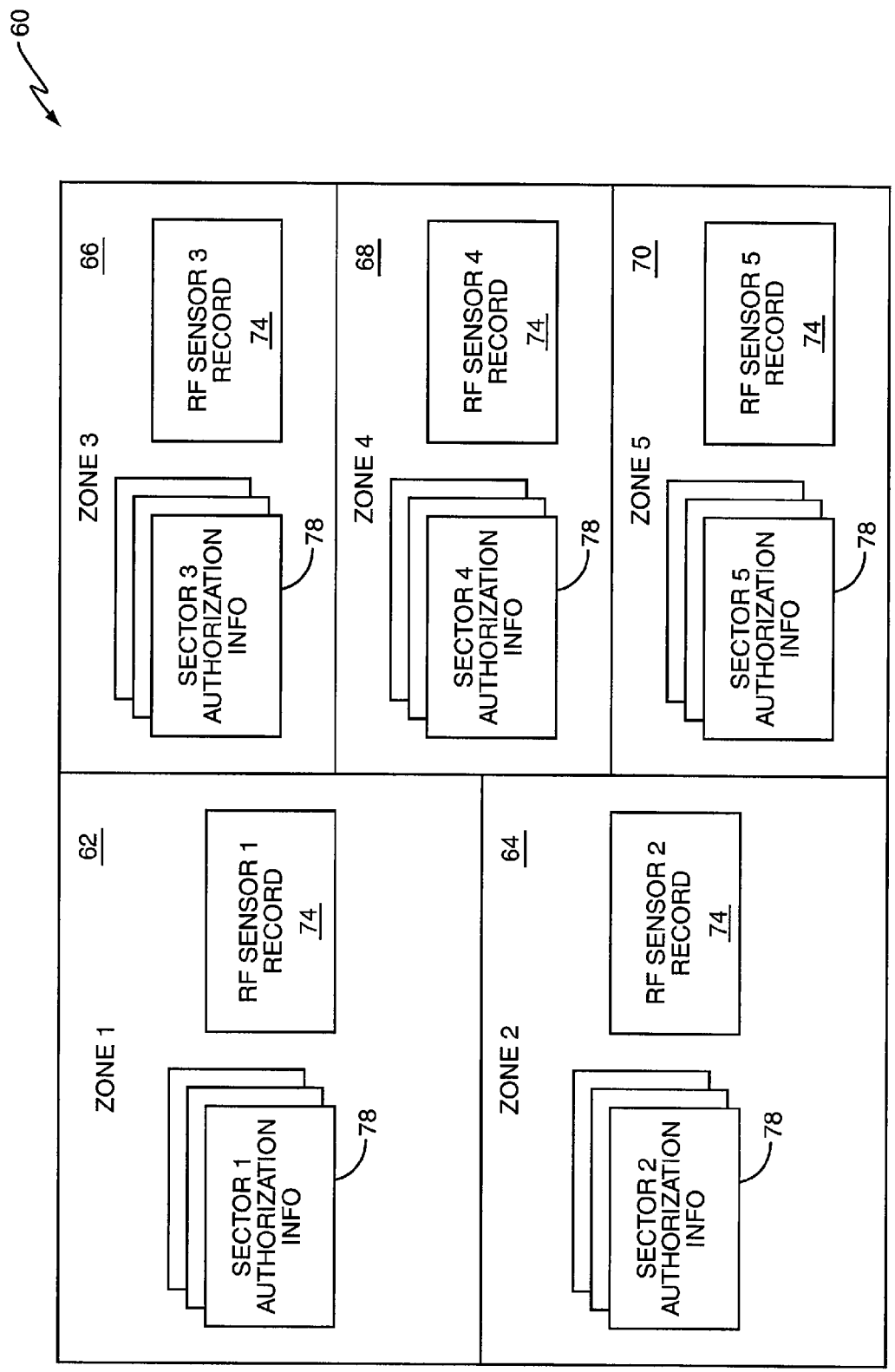
FIG. 6 is a block diagram of one embodiment of a virtual construction site map.
Figure 7:
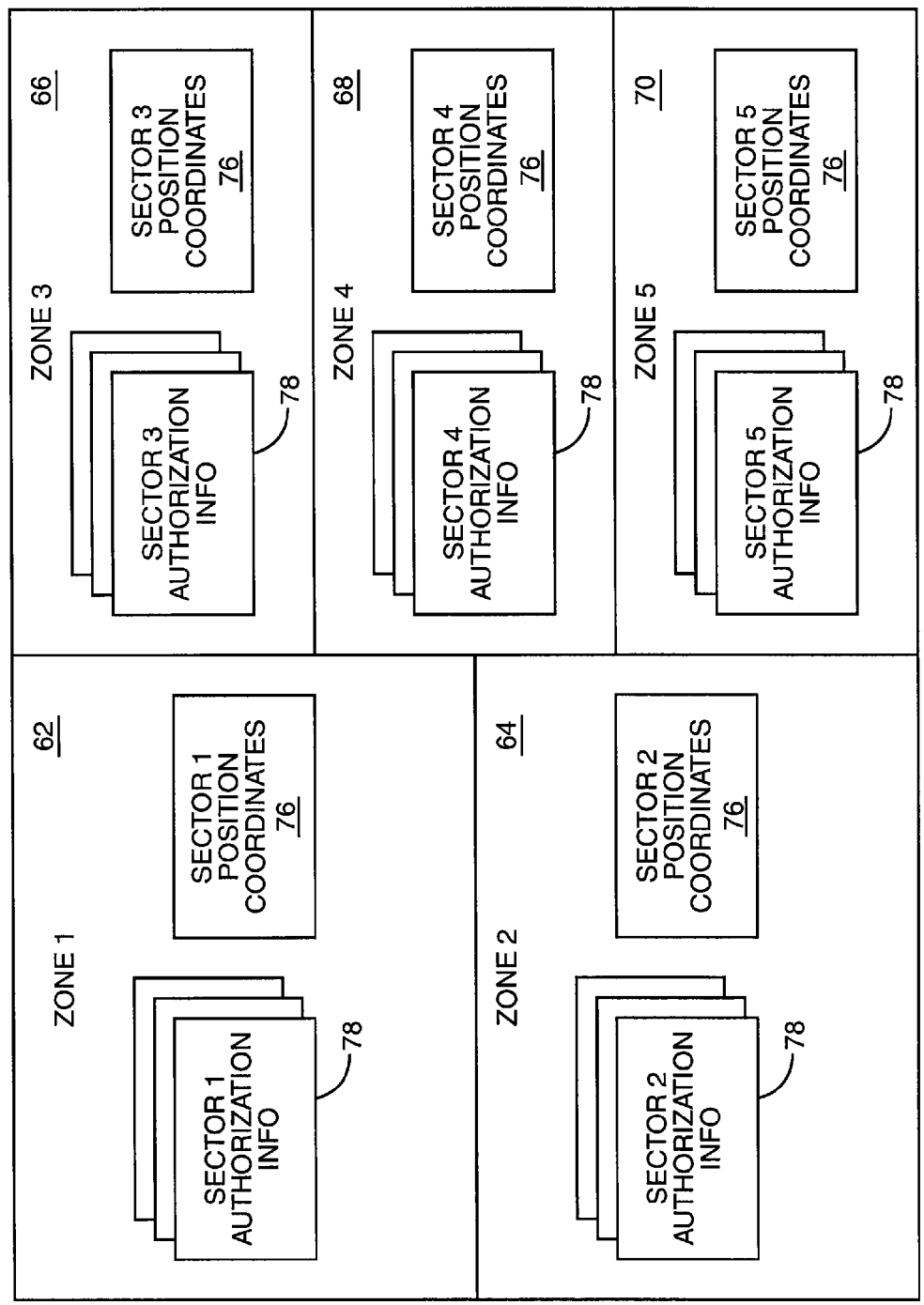
FIG. 7 is a block diagram of another embodiment of a virtual construction site map.

In one embodiment, the information processing function 46 generates a virtual map 60 of the construction site 12 and associates each sector 14-22 with a corresponding zone 62-70 of the map 60 as illustrated in FIGS. 6 and 7. FIG. 6 illustrates one embodiment of the virtual map 60 where the five map zones 62-70 correspond to the five sectors 14-22 of the construction site 12 illustrated in FIG. 1. The information processing function 46 associates each of the map zones 62-70 with sector-specific information stored in a database 72 with the corresponding sector 14-22. Preferably, the sector-specific information identifies at least the area covered by each of the sectors 14-22 (sector area information) and the access authority associated with each of the sectors 14-22 (sector authorization information). When the monitoring system 10 receives reported location and personal information, the information processing function 46 accesses the virtual map 60 and identifies the zone 62-70 corresponding to the reported location information. The processing function 46 then retrieves the sector authorization information associated with the identified zone 62-70. The processing function 46 compares the reported personal information with the retrieved sector authorization information to determine whether unauthorized access has occurred.

In one embodiment, as illustrated in FIG. 6, the sector area information corresponds to respective records 74 that uniquely identify the sensor 28 located in each of the sectors 14-22. That is, each of the sensors 28 is known to be located in a certain sector 14-22 of the construction site 12. This sensor location information is stored in the database 72 as a series of sensor location records 74. The information processing function 46 associates each of the sensor location records 74 with the map zone 62-70 that represents the sector 14-22 covered by the corresponding sensor 28. As such, when one of the sensors 28 reports detection of in-range hard hat electronic circuitry 26, the information processing function 46 searches the virtual map 60 for the sensor record 74 corresponding to the reporting sensor 28.

In the event that two or more sensors 28 detect the same electronic circuitry 26 at approximately the same time, e.g., due to signal coverage overlap, the information processing function 46 determines which sector 14-22 the electronic circuitry 26 is most likely located in. To that end, each of the sensors 28 reports a signal strength measurement. The signal strength measurement indicates the proximity of the electronic circuitry 26 to a particular one of the sensors 28. The information processing function 46 analyses received signal strength measurement data when multiple sensors 28 report detection of the same electronic circuitry 26 at approximately the same time. The sensor 28 reporting the greatest signal strength measurement is identified. The information processing function 46 then searches the virtual map 60 for the sensor record 74 corresponding to the identified sensor 28.

FIG. 7 illustrates another embodiment of the virtual map 60 where the sector area information corresponds to a range of GPS or other position coordinates 76 that pinpoint the areas covered by each of the sectors 14-22. That is, each of the sectors 14-22 covers a known area at the construction site 12 which can be represented as a group of position coordinates 76. Each grouping of position coordinates 76 is stored in the database 72. Upon retrieval, the information processing function 46 associates each group of position coordinates 76 with the map zone 62-70 that represents the sector 14-22 including the corresponding group of coordinates 76. As such, when in-range hard hat electronic circuitry 26 directly indicates its location by providing GPS or other position coordinates, the information processing function 46 searches the virtual map 60 for a group of position coordinates 76 that includes the reported coordinates.

Either way, when location information is reported to the monitoring system 10, the information processing function 46 identifies which of the sectors 14-22 covers the area indicated by the location information. For example, when the person wearing the hard hat 24 in FIG. 1 enters the second sector 16, the hard hat's electronic circuitry 26 directly or indirectly indicates the hard hat's location. In one case, the sensor 28 that detected the hard hat 24 is identified. In another case, GPS or other position coordinates are reported to the monitoring system 10. The information processing function 46 uses either the identity of the reporting sensor 28 or the reported position coordinates to identify the second map zone 64 which is associated with the second sector 16, e.g., by identifying the corresponding sensor location record 74 or group of position coordinates 76.

After the map zone 62-70 associated with reported location information is accessed, the corresponding sector authorization information record 78 is retrieved from the database 72. The information processing function 46 then compares the personal information provided by the hard hat electronic circuitry 26 with the retrieved authorization record 78 to determine whether the circuitry 26 is located in an unauthorized area. For example, the sector authorization information may correspond to the same types of personal information reported by the electronic circuitry 18, e.g., medical history, trade, qualifications, certifications, proficiencies, training, education, etc. If the received personal information fails to satisfy one or more requirements indicated by the retrieved sector authorization information record 78, then unauthorized access has occurred. For example, if the person who has entered the second sector 16 in FIG. 1 is wearing a hard hat 24 that indicates his training or qualifications are not sufficient for the second sector 16, the information processing function 46 indicates that an unauthorized access has occurred.

In the event that a person wearing the hard hat 24 enters a prohibited area on the construction site 12 or when the hard hat is worn by the wrong person or not worn at all, the message generation function 48 issues a message to the electronic circuitry 26 of the hard hat. The message indicates a safety breech. In one embodiment, the hard hat 24 has an alarm 80 that activates in response to a received warning message generated by the message generation function 48. For example, the alarm 80 may vibrate, sound a warning or display a message. Optionally, the message generation function 48 also displays a warning at the monitoring system 10 for notifying personnel that a safety breech has occurred.

Figure 8:
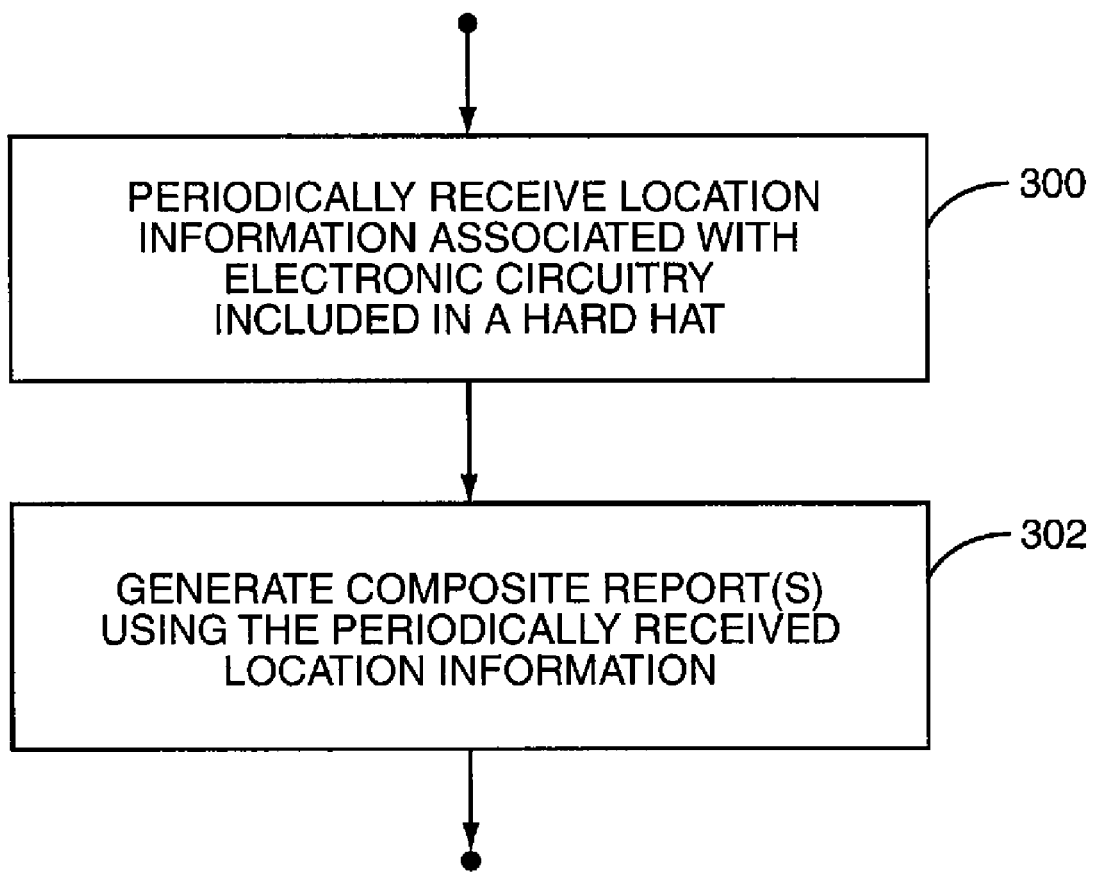
FIG. 8 illustrates one embodiment of processing logic for reporting information periodically provided by electronic circuitry included in a construction hard hat.

The functions 46 and 48 of processing reported information and generating messages may be monitored over time by the report generation function 50. In one embodiment, incidents of hard hats not being worn or worn by the wrong personnel are tracked over time and one or more reports are generated. The reports may indicate the propensity of certain personnel to not wear a hard hat or to wear a hard hat other than their own. In another embodiment, personnel location is tracked over time and one or more reports are generated. To that end, the monitoring system 10 periodically receives location information directly or indirectly indicated by the hard hat electronic circuitry 26, as illustrated by Step 300 of FIG. 8. The report generation function 50 generates one or more composite reports based on the received information, as illustrated by Step 302 of FIG. 8. The reports may indicate composite personnel activity on a per-sector basis, a per-individual basis or both. The report generation function 50 may report personnel activity at the construction site 12 over a predetermined period of time, e.g., on an hourly, daily or weekly basis. By tracking and reporting worker movement over time, efficiency and productivity may be increased at the site 12. Further, reports may be used to investigate accidents, assist in safety audits, identify trends, etc.

While the invention has been described in terms of specific embodiments, it should be understood that the present invention is not limited by the foregoing description, nor is it limited by the accompanying drawings. Instead, the present invention is limited only by the following claims and their legal equivalents.

What is claimed is:

1. A method of monitoring the activities of workers on a construction site where each worker wears a hardhat having an electric circuit forming a party thereof where the electric circuit functions to transmit information to a monitoring system, the method comprising:

dividing the construction site into a plurality of distinct sectors where each sector covers an area not covered by another sector;

transmitting information from the electric circuits of the hardhats of workers located in the plurality of sectors of the construction site where the information transmitted from the electric circuits of the hardhats includes position signals that indicate the location of workers on the construction site and personal information uniquely associated with the workers wherein the hardhats of the workers in the plurality of distinct sectors are monitored by the monitoring system;

utilizing on or more processors to process the position signals and personal information received from the electric circuit of each hardhat; and generating one or more messages target for workers whose location and personal information indicate access to an unauthorized area of the construction site.

2. The method of claim 1, further comprising receiving the personal information from one or more sensors located at the construction site which are in wireless communicative contact with the electronic circuitry.

3. The method of claim 1, wherein generating one or more messages based on the personal information received from the electronic circuitry and personnel location comprises issuing a warning to the personnel whose location and personal information indicate access to an unauthorized area at the construction site.

4. The method of claim 3, wherein issuing a warning to the personnel whose location and personal information indicate access to an unauthorized area at the construction site comprises:

identifying sectors of the construction site occupied by one or more of the personnel based on personnel location;

identifying the personnel who have accessed an unauthorized sector of the construction site based on the personal information; and issuing a warning to individual ones of the personnel who have accessed an unauthorized sector.

5. The method of claim 4, wherein identifying sectors of the construction site occupied by one or more of the personnel based on personnel location comprises:

receiving GPS coordinates determined by the electronic circuitry; and identifying one or more sectors of the construction site that include a geographic area represented by the GPS coordinates.

6. The method of claim 5, wherein identifying one or more sectors of the construction site that include a geographic area represented by the GPS coordinates comprises:

accessing a virtual map of the construction site; and identifying one or more zones of the virtual map associated with the GPS coordinates.

7. The method of claim 4, wherein identifying sectors of the construction site occupied by one or more of the personnel based on personnel location comprises:

identifying one or more wireless sensors in communicative contact with the electronic circuitry; and identifying one or more sectors of the construction site that include individual ones of the wireless sensors.

8. The method of claim 7, wherein identifying one or more sectors of the construction site that include individual ones of the wireless sensors comprises:

accessing a virtual map of the construction site; and identifying one or more zones of the virtual map associated with individual ones of the wireless sensors.

9. The method of claim 7, wherein identifying one or more sectors of the construction site that include individual ones of the wireless sensors comprises:
analyzing signal strength data reported by two or more of the wireless sensors that detect the same electronic circuitry; and
identifying the sector of the construction site that includes the wireless sensor that reported the strongest signal strength data.

10. The method of claim 4, wherein identifying the personnel who have accessed an unauthorized sector of the construction site based on the personal information comprises:
accessing authorization information related to individual ones of the sectors; and
identifying the personnel whose personal information fails to satisfy one or more requirements indicated by the authorization information related to individual ones of the sectors.

11. The method of claim 10, wherein the personal information comprises at least one of a personal identifier, medical information, trade information, qualification information, certification information, proficiency information, training information, safety violation information, and educational information.

12. The method of claim 1, further comprising:
processing sensor data directly or indirectly received from the electronic circuitry, the sensor data indicating whether one or more of the hard hats are worn by individual ones of the personnel; and
generating one or more messages based on the sensor data.

13. An electronic system:
comprising one or more processors configured to process personal information directly or indirectly received from electronic circuitry formed as part of one or more hard hats worn by personnel located at a construction site, the personal information being uniquely associated with individual ones of the personnel, and generate one or more messages based on the personal information received from the electronic circuitry and personnel location;
wherein the one or more processors are configured to generate one or more messages based on the personal information received from the electronic circuitry and personnel location by generating a warning targeted for the personnel whose location and personal information indicate access to an unauthorized area at the construction site;
wherein the one or more processors are configured to generate a warning targeted for the personnel whose location and personal information indicate access to an unauthorized area at the construction site by identifying sectors of the construction site occupied by one or more of the personnel based on personnel location, identifying the personnel who have accessed an unauthorized sector of the construction site based on the personal information, and generating a warning targeted for individual ones of the personnel who have accessed an unauthorized sector;
wherein the one or more processors are configured to identify sectors of the construction site occupied by one or more of the personnel based on personnel location by processing GPS coordinates determined by the electronic circuitry and identifying one or more sectors of the construction site that include a geographic area represented by the GPS coordinates; and
wherein the one or more processors are configured to identify one or more sectors of the construction site that include a geographic area represented by the GPS coordinates by accessing a virtual map of the construction site and identifying one or more zones of the virtual map associated with the GPS coordinates.

14. The electronic system of claim 13, wherein the one or more processors are configured to identify sectors of the construction site occupied by one or more of the personnel based on personnel location by identifying one or more wireless sensors in communicative contact with the electronic circuitry and identifying one or more sectors of the construction site that include individual ones of the wireless sensors.

15. The electronic system of claim 14, wherein the one or more processors are configured to identify one or more sectors of the construction site that include individual ones of the wireless sensors by accessing a virtual map of the construction site and identifying one or more zones of the virtual map associated with individual ones of the wireless sensors.

16. The electronic system of claim 14, wherein the one or more processors are configured to identify one or more sectors of the construction site that include individual ones of the wireless sensors by analyzing signal strength data reported by two or more of the wireless sensors that detect the same electronic circuitry and identifying the sector of the construction site that includes the wireless sensor that reported the strongest signal strength data.

17. The electronic system of claim 13, wherein the one or more processors are configured to identify the personnel who have accessed an unauthorized sector of the construction site based on the personal information by accessing authorization information related to individual ones of the sectors and identifying the personnel whose personal information fails to satisfy one or more requirements indicated by the authorization information related to individual ones of the sectors.

18. The electronic system of claim 17, wherein the personal information comprises at least one of a personal identifier, medical information, trade information, qualification information, certification information, proficiency information, training information, safety violation information, and educational information.

19. The electronic system of claim 13, wherein the one or more processors are further configured to process sensor data directly or indirectly received from the electronic circuitry, the sensor data indicating whether one or more of the hard hats are worn by individual ones of the personnel, and generate one or more messages based on the sensor data.

20. A computer program product for monitoring activity at a construction site, comprising:
program code for dividing the construction site into a plurality of distinct sectors where each sector covers an area not covered by another sector;
program code for processing personal information directly or indirectly received from electronic circuitry formed as part of one or more hard hats worn by personnel located in the plurality of distinct sectors on the construction site including position signals that indicate the location of personnel on the construction site, the personal information being uniquely associated with individual ones of the personnel; and
program code for generating one or more messages targeted for personnel whose location and personal information indicate access to an unauthorized area of the construction site.

21. The computer program product of claim 20, wherein the program code for generating one or more messages based on the personal information received from the electronic circuitry and personnel location comprises program code for generating a warning targeted for the personnel whose location and personal information indicate access to an unauthorized area at the construction site.

22. The computer program product of claim 21, wherein the program code for generating a warning targeted for the personnel whose location and personal information indicate access to an unauthorized area at the construction site comprises:
  program code for identifying sectors of the construction site occupied by one or more of the personnel based on personnel location;
  program code for identifying the personnel who have accessed an unauthorized sector of the construction site based on the personal information; and
  program code for issuing a warning to individual ones of the personnel who have accessed an unauthorized sector.

23. A method of tracking personnel location at a construction site, comprising:
  periodically receiving position signals that indicate the location of personnel on the construction site associated with electronic circuitry formed as part of one or more hard hats worn by personnel located at the construction site; and
  generating one or more composite reports targeted for personnel whose location and personal information indicate access to an unauthorized area of the construction site, wherein the reports indicate location of the personnel on the construction site at various times over a selected period of time.

24. The method of claim 23, wherein periodically receiving location information associated with electronic circuitry formed as part of one or more hard hats worn by personnel located at the construction site comprises periodically receiving GPS coordinates determined by the electronic circuitry.

25. The method of claim 24, wherein generating one or more composite reports based on the location information periodically received comprises:
  identifying one or more sectors of the construction site that include a geographic area represented by the GPS coordinates; and
  reporting the sectors identified.

26. The method of claim 25, wherein identifying one or more sectors of the construction site that include a geographic area represented by the GPS coordinates comprises:
  accessing a virtual map of the construction site; and
  identifying one or more zones of the virtual map associated with the GPS coordinates.

27. The method of claim 23, wherein periodically receiving location information associated with electronic circuitry formed as part of one or more hard hats worn by personnel located at the construction site comprises periodically identifying one or more wireless sensors in communicative contact with the electronic circuitry.

28. The method of claim 27, wherein generating one or more composite reports based on the location information periodically received comprises:
  identifying one or more sectors of the construction site that include individual ones of the wireless sensors; and
  reporting the sectors identified.

29. The method of claim 28, wherein identifying one or more sectors of the construction site that include individual ones of the wireless sensors comprises:
  accessing a virtual map of the construction site; and
  identifying one or more zones of the virtual map associated with individual ones of the wireless sensors.

30. An electronic system:
  comprising one or more processors configured to periodically process position signals that indicate the location of personnel on the construction site associated with electronic circuitry formed as part of one or more hard hats worn by personnel located at the construction site and generate one or more composite reports targeted for personnel whose location and personal information indicate access to an unauthorized area of the construction site, wherein the reports indicate location of the personnel on the construction site at various times over a selected period of time; and
  wherein the one or more processors are further configured to periodically process sensor data directly or indirectly received from electronic circuitry included in individual ones of the hard hats, the sensor data indicating whether one or more of the hard hats are worn by individual ones of the personnel, and generate one or more composite reports based on the sensor data.

31. A computer program product for tracking personnel location at a construction site, comprising:
  program code for dividing the construction site into a plurality of distinct sectors where each sector covers an area not covered by another sector;
  program code for periodically processing position signals that indicate the location of personnel on the construction site associated with electronic circuitry formed as part of one or more hard hats worn by personnel located at the construction site; and
  program code for generating one or more composite reports targeted for personnel whose location and personal information indicate access to an unauthorized area of the construction site, wherein the reports indicate location of the personnel on the construction site at various times over a selected period of time.

* * * * *